Figure 5:
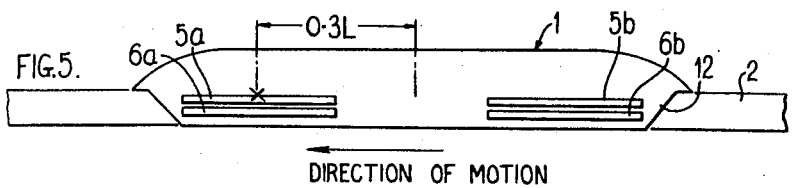

United States Patent

Randell

[15] 3,703,869
[45] Nov. 28, 1972

[54] TRACK GUIDED VEHICLE

[72] Inventor: Richard Randell, Burwell, England

[73] Assignee: Tracked Hovercraft Limited, London, England

[22] Filed: July 28, 1970

[21] Appl. No.: 58,865

[52] U.S. Cl. ............................104/23 FS, 105/145
[51] Int. Cl. .............................................B61b 13/08
[58] Field of Search............104/23 FS, 134, 148 LM; 105/141, 145

[56] References Cited

UNITED STATES PATENTS

| | | | |
|---|---|---|---|
| 2,985,114 | 5/1961 | Lindner | 104/134 |
| 3,575,115 | 5/1971 | Giraud | 104/23 FS |
| 2,404,984 | 7/1946 | Powers | 104/148 LM |
| 3,369,497 | 2/1968 | Driver | 104/23 FS |

*Primary Examiner*—Gerald M. Forlenza
*Assistant Examiner*—D. W. Keen
*Attorney*—Cameron, Kerkam and Sutton

[57] ABSTRACT

In a track guided gas cushion vehicle two longitudinally spaced pairs of cushion forming pads are provided on sides of the vehicle which embrace a rectangular-section track. The cushions of these pairs of pads co-operate with upper portions of the track sides to counteract lateral and yawing movements of the vehicle, due for example to cross winds. A further pair of cushion forming pads is provided on the vehicle sides, below the other pairs of pads, so that their cushions co-operate with lower portions of the track sides, and towards the vehicle rear, to counteract rolling moments exerted on the vehicle. Cushion forming pads to support the vehicle perform substantially no roll stabilizing function so as to be minimally perturbed by forces exerting yawing or rolling moments on the vehicle. Preferably the vehicle is propelled by a single sided linear induction motor.

10 Claims, 11 Drawing Figures

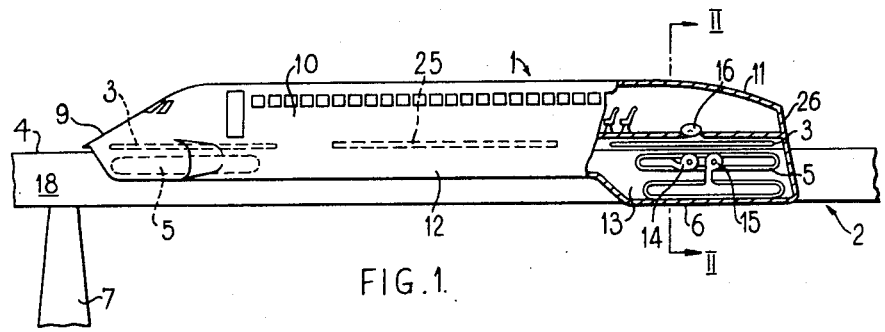
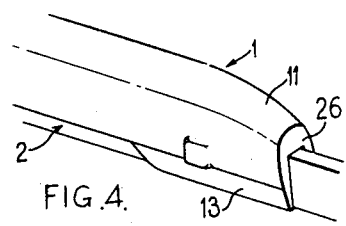
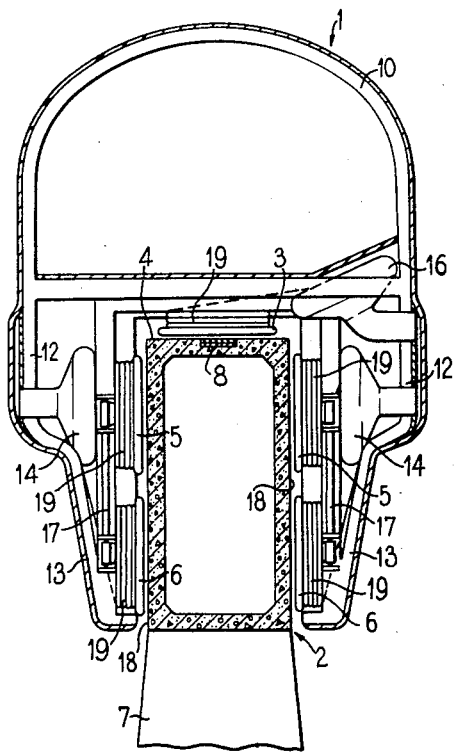
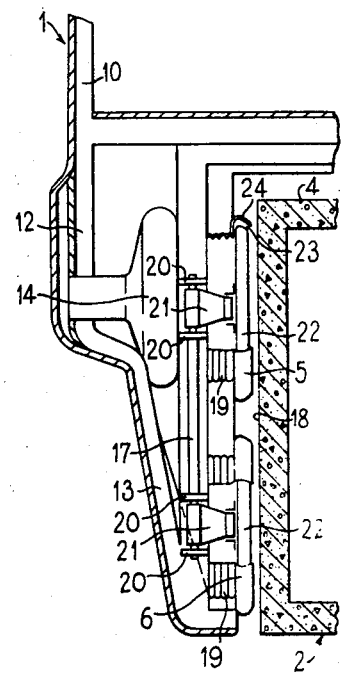

DIRECTION OF MOTION

TRACK GUIDED VEHICLE

This invention relates to track guided gas cushion vehicles.

According to this invention there is provided a gas cushion vehicle adapted for operation along a prepared track of substantially rectangular cross-section, the vehicle having downwardly extending side portions to embrace the sides of the track, gas cushion support means carried by the vehicle and adapted to form and maintain at least one gas cushion to co-operate with the upper surface of the track to support the vehicle thereon, at least two pairs of gas cushion guide means, one of each pair of said guide means being carried by a respective one of said side portions, each of said guide means being adapted to form and maintain a gas cushion for co-operation with its associated side surface of the track, and being positioned so that the centers of the gas cushions formed and maintained by one of the said pairs of guide means are longitudinally spaced from the centers of the gas cushions formed and maintained by the other of the said pairs of guide means, and lie in substantially the same horizontal plane, and at least one further pair of gas cushion means carried by the said side portions each adapted to form and maintain a gas cushion, one for co-operation with each side of the track, and positioned so that the centers of their cushions lie on a lower level than those of the said guide means and between the longitudinal center of the vehicle and that end thereof which is to the rear in relation to the direction of travel of the vehicle.

With such a vehicle the advantage is obtained that the load on the gas cushion means, the cushions of which co-operate with the sides of the track, is unaffected by vehicle weight. Conversely any desired preloading of these gas cushion means to provide a desired degree of roll reaction can be generated without affecting the gas cushion means adapted to support the vehicle on the track. This can be important because the stability of a track guided gas cushion vehicle and the comfort of passengers that it carries is in part governed by the stiffness of the gas cushion means. It is found that higher stiffnesses are desirable to counteract roll than to counteract vertical oscillations and it is therefore an advantage not to use supporting gas cushion means both for support and as a means for counteracting roll.

There is also the factor that aerodynamic lift forces likely to be exerted on the vehicle, and which will affect the supporting gas cushion means, will not affect the roll stability of the vehicle if no roll stabilizing function is required of the supporting gas cushion means.

Furthermore since there is no requirement to react any rolling moments exerted on the vehicle by the supporting gas cushion means, the track may be comparatively less wide than would otherwise be necessary, in order for example to accommodate pairs of side by side supporting and roll combating cushions. This leads to the possibility of forming the track of a rectangular cross-section, deeper than it is broad, which is structurally advantageous, more economically than would otherwise be possible. The track will also occupy less space than other proposed forms of track, which can be a crucial factor when the cost of right-of-way acquisitions is taken into account.

In practice a track for vehicles in accordance with the invention would almost certainly have to be elevated, and the form of track made possible by the present invention enables beam spans of longer relative lengths to be provided than might otherwise be possible, effecting an economy through a reduction in the number of support structures required. It is in fact envisaged that a track for a gas cushion vehicle in accordance with the present invention will be of the order of 5ft. wide and 7ft. deep, which readily enables beams of the order of 120ft. to be employed. Compared with equal length spans of other cross-section the "tall" rectangular cross-section track has the smallest vertical deflection under load, which is obviously advantageous.

Preferably a vehicle in accordance with the present invention is arranged to be propelled by a single sided linear induction motor. With such motors repulsion and attraction forces are encountered which necessarily tend to exert perturbing forces on the vehicle. A track, however, for a vehicle in accordance with the present invention readily lends itself for the mounting of a horizontally disposed reaction rail on its top surface for co-operation with a single sided stator structure carried by the vehicle. With such an arrangement the perturbing forces likely to be exerted on the vehicle by the repulsion and attraction forces will primarily only act in a vertical sense, as also will the reaction exerted on the vehicle through the operation of means which are desirably provided to move the stator structure relative to the vehicle body to maintain the gap between the stator structure and the reaction rail substantially constant. The vehicle supporting gas cushion means will readily be able to accommodate these perturbing forces and just as importantly the perturbations will not affect the gas cushion guidance means. There is also the factor that passengers can tolerate vertical accelerations better than lateral accelerations.

The invention is further described below with reference to the accompanying drawings in which:

FIG. 1 is a side view partly cut away of a gas cushion vehicle in accordance with the invention mentioned on an elevated track, FIG. 2 is a section along the line II—II of FIG. 1, FIG. 3 is an enlarged detailed view of FIG. 2, FIG. 4 is a perspective view of the rear end of the vehicle of FIG. 1, and FIGS. 5–11 are diagrammatic side elevations of bidirectional vehicles in accordance with the invention showing alternative ways in which gas cushion guide means may be arranged.

Referring to FIGS. 1–3, a gas cushion vehicle 1 is shown mounted on an elevated track 2 which may conveniently be made of concrete and of hollow section as indicated in FIG. 2. The track 2 is supported on piers 7 and is of rectangular cross-section, deeper than it is broad, to provide a horizontal upper surface 4 and vertical side surfaces 18. The vehicle, which is intended for high speed operation, i.e., in excess of 200 kilometers per hour, has a streamlined front end 9, a rear end 11 and side portions 12 extending downwardly from its main body part 10 to embrace the track 2. The rear part 13 of each side portion extends downwardly below the level of the remainder of the side portions, the lower edge of the rear parts 13 being approximately coincident with the bottom of the track 2.

Because of its streamlined shape, the center of aerodynamic pressure through which side forces due to cross winds may be considered to act will be at some point forward of the mid-length point of the vehicle. Accordingly when operating in a cross wind the vehicle will be subjected to a yawing moment. The provision of the rear parts 13 of the side portions will act somewhat after the manner of fins resulting in the equivalent point of application of the lateral aerodynamic vector being displaced further from the front of the vehicle, and also possibly being brought lower, than would otherwise be the case, and hence help to reduce the yawing and rolling moments which will have to be reacted.

The vehicle is provided with two gas cushion means or hoverpads 3, each adapted to form and maintain a gas cushion beneath the vehicle body to co-operate with the upper surface 4 of the track to support the vehicle thereon. Two pairs of gas cushion guide means or hoverpads 5 are carried by the side portions, each hoverpad 5 being adapted to form and maintain a gas cushion to co-operate with the side surfaces 18 of the track, to guide the vehicle therealong, the centers of the gas cushions of the two pairs of hoverpads 5 being longitudinally displaced and lying in substantially the same horizontal plane. A further pair of gas cushion means or hoverpads 6 is carried by the rear parts 13 of the side portions, one on each part below the hoverpads 5, each of the hoverpads 6 also being adapted to form and maintain a gas cushion to co-operate with its associated side surface 18 of the track. The centers of the gas cushions of the hoverpads 6 are positioned substantially vertically below the centers of the cushions of the rear hoverpads 5. The vehicle is arranged to be propelled by a linear induction motor comprising a single sided stator structure 25 suspended below and supported from the underside of the main body part 10 of the vehicle for co-operation with a reaction rail 8 inset into and flush with the upper surface 4 of the track 2. To maintain, in operation, the gap between the stator 25 and the reaction rail 8 substantially constant, provision will be made to effect vertical adjustment of the position of the stator 25 relative to the vehicle body.

Fans 16 (front fans not shown) supply air to hoverpads 3 via ducting (not shown). Similarly, fans 14 (front fans not shown) supply air to hoverpads 5 and fans 15 supply air to hoverpads 6. To increase the comfort of the ride given to passengers, the hoverpads 3, 5 and 6 are movably mounted on the vehicle 1 and remain substantially the same distance from the track 2 despite a possible relative movement of several centimeters between track and vehicle. Bellows 19 interconnect the hoverpads 3, 5 and 6 to the final part of the ducting from the fans 14, 15 and 16. Springs (not shown) within the bellows 19 provide secondary suspension allowing the hoverpads 5 and 6 to move towards and away from the side portions 12 and the hoverpads 3 to move towards and away from the main body part 10. The hoverpads 3, 5 and 6 are of a peripheral jet type, consisting of a base 22 and an outer member 24 connected to it by spacers (not shown) so as to form a passageway for pressurized air from inside the bellows 19 to reach the annular orifice 23.

Preferably the hoverpad 6 on each side of the vehicle is connected by an anti-roll device to the hoverpad 5 that is positioned vertically above it, so as in effect to by-pass the secondary suspension system which will be relatively soft to give the needed 'soft' lateral ride, and so provide a relatively stiff suspension to react externally applied rolling moments without large vehicle movements. The anti-roll device may conveniently comprise torsion bars 17, as shown in FIGS. 2 and 3. One torsion bar 17 may be provided to interconnect the front ends and one to interconnect the rear ends of each hoverpad 6 and the vertically adjacent pad 5. The torsion bars 17 are journalled to the vehicle at 20 and connected to the bases 22 of the hoverpads 5 and 6 by pivoting linkages 21 which are made fast to the torsion bars 17 so as to resist relative movement between the pads towards and away from their associated side portion.

As can be seen in FIG. 4 the rear end 11 may be tapered in the rearward direction both in the side view of the vehicle 1 (see FIG. 1) and also in a plan view so that the height of the vehicle at its rear end above the track and its width progressively decreases in the rearward direction. The rear end 11 terminates in a plane 26 substantially transverse to the longitudinal axis of the vehicle, and is so positioned that it does not substantially alter the pattern of flow lines over the rear end that would have been present in a no cross wind condition if the very end of the vehicle had continued to taper gradually. By this means yawing moments due to a cross wind may be reduced.

Quite apart from the fact that to arrange the hoverpads 6 vertically below the rear pair of hoverpads 5 facilitates their coupling by an anti-roll device, to provide the benefit already noted, by disposing the two pairs of pads in this manner, rolling moments on the vehicle can be reacted by them without in so doing imposing additional loads on the front pair of hoverpads 5. To react roll by side disposed hoverpads also avoids any need for the support pads 3 to play any part in roll control. The means for counteracting roll, and providing support and lateral guidance, are therefore operatively decoupled, so that perturbations or forces affecting one do not affect the others.

The vehicle described above is, of course, designed primarily for unidirectional travel only. In a transport system employing vehicles in accordance with this invention, however, it is believed it would be advantageous to provide vehicles which could operate with equal facility in either direction. This for practical purposes means that the vehicle should be symmetrical about its fore and aft axis and as a consequence the advantage which might be obtainable from the fin-like action of the rear parts 13 of the side portions of the vehicle of FIGS. 1–4 would be lost. More importantly the arrangement of the side guidance pads most suitable for a vehicle for travelling in one direction may be unsuitable or inadequate when the vehicle is to travel in the opposite direction.

Alternative arrangements of side guidance pads for a bidirectional vehicle are indicated in FIGS. 5–11. In each case the vehicle shown has side portions 12 extending downwardly to a uniform extent along their full length to a level approximately coincident with the bottom of the track. For the purposes of comparison it is assumed that each vehicle is to travel in the direction of the arrow, i.e., from right to left as drawn, that the aerodynamic center of pressure will be situated at a point indicated at X towards the front of the vehicle in relation to its direction of travel, at a level substantially coincident with the top surface of the track, and that the hoverpads 5 and 6 are each of half the track depth. This, of course, would in practice not be possible but the example is representative of the magnitude of the forces which will be involved. Also where a load or reaction is attributed to a particular hoverpad position it will actually be that applied to or provided by a pad pair at this position, there being one pad on each side of the track.

Figure 6:
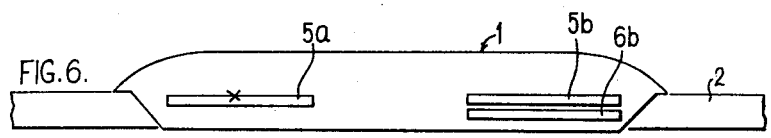

Referring now to FIG. 5, there is shown a vehicle having two pairs of side guidance pads 5a and 5b and two pairs of further pads 6a and 6b. With such an arrangement, however, in the case taken and in which the point X lies in a vertical plane coincident with the centers of the pads 5a and 6a, it can be shown that the load on pads 6a, i.e., that on the pair of pads 6 which is to the fore in relation to the direction of travel, will be zero when the vehicle is in static equilibrium. Hence in practice only a three pad pair system is required, as shown in FIG. 6, for each intended direction of travel.

If the side force Y acting at the point X is considered, then with the pads arranged as shown, taking moments about lines joining pad centers, it will be found that for equilibrium the reaction provided by pad 5a will be Y, that by pad 5b will be 0.5Y and that by pad 6b will be −0.5Y.

If two pairs of pads 6 were installed on a vehicle, as indicated in FIG. 5, then provision would be made selectively to bring into operation that one of the pairs which was to the rear, and to render that which was to the fore, inoperative. Alternatively a single pair of pads 6 might be provided arranged to be moved from one end to the other of the vehicle depending upon its direction of travel, or the pads might be demountably connected to the vehicle and provision made optionally to connect them to one end or the other thereof. Although the provision of two pairs of hoverpads 6, one pad at each end of the vehicle, would necessarily entail a weight penalty in so far as one pair would be redundant depending upon the intended direction of travel, this penalty could well be acceptable in so far as it would avoid the complications involved in arranging for one pair to be moved between the ends of the vehicle.

Figure 7:
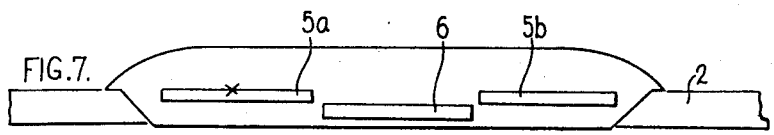

With reference to FIG. 7, a further possible alternative arrangement of pads 5 and 6 is shown in which the two pairs of side guidance pads 5a and 5b are equally displaced from the mid-length point of the vehicle, and the pair of pads 6 is centered at the vehicle mid-length point, below the level of the pads 5. Considering a side force Y, acting at the point X in a vertical plane coincident with the center of pad 5a, then taking moments about the centers of pads 5a and 5b, the reaction provided by the pair of pads 6 will be −0.5Y. In fact wherever the pads 6 are positioned at the level indicated, this reaction will remain the same. However, taking moments about the center of the rear pad 5b, it will be found that reaction of the front pad 5a must be 1.25Y. Hence for equilibrium the reaction provided by the rear pad 5b will be 0.25Y. Necessarily, for equilibrium the sum of the reactions provided by the pads 5a, 5b and 6 must equal the total side force exerted on the vehicle. This distribution of load reaction on the pads obviously gives rise to difficulties if the vehicle is to be bidirectional, in so far as the reaction required of that pad 5 which is to the fore in relation to the direction of travel is so much more than that of the symmetrically arranged pad 5 which will be to the rear, and would almost certainly involve the installation of potentially redundant power in the system. There is the further possible disadvantage that the load on the pad pair 5a is affected, i.e. increased, when rolling moments on the vehicle come to be reacted. Nevertheless if the equivalent point of application of the lateral aerodynamic vector was further displaced from the front end of the vehicle in relation to its direction of travel than the point X taken in this example, and other factors such as the centrifugal loads to be reacted are taken into account, the arrangement indicated might be practical.

Figure 8:
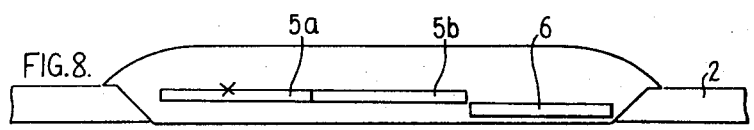

Referring now to FIG. 8, a yet further alternative arrangement is shown in which the pad pair 5a is mounted in the same position as in FIG. 7 but the pad pair 5b is moved forward so that their centers are substantially coincident with the mid-length point of the vehicle. The further pad pair 6 is positioned at the same level as before but at a position displaced rearwardly of the mid-length point of the vehicle to the same extent as the front pad pair 5a is displaced forwardly thereof. By considering moments about a line joining the centers of pads 5b and 6, it will be seen that only by positioning pad 5b forward of pad 6 will the load on the front pads 5a be reduced. In the example illustrated the load on the front pad pair 5a will be 0.5Y and pad pair 5b takes the load Y. This configuration would be extremely economical if pads 5a and 6 could be moved up and down depending upon the direction in which the vehicle was required to travel to take over each other's function.

A still further non-illustrated alternative would be to provide four pad pairs, two pairs symmetrically disposed, one pair towards each end of the vehicle, generally corresponding to the pads 5a and 5b of the illustrated examples, and two pairs disposed symmetrically either side of the mid-length point of the vehicle, each latter pair being arranged to be selectively moved vertically between a position in the same horizontal plane as the two end pads and a position therebelow. Depending upon the desired direction of travel, that one of the two middle pairs which would be to the rear would be moved to the lower position. To ensure equal load sharing between the pads, the stiffness of the secondary suspensions thereof may be adjusted, i.e. some will be provided with a stiffer secondary suspension than others.

Figure 9:
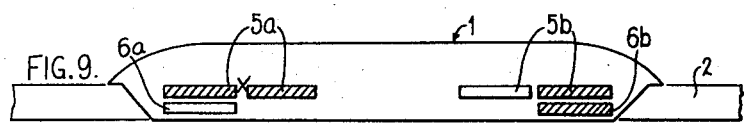

If it was required to equip the vehicle with hoverpads of equal size, supplied by standard size fans, then the arrangement of pads described in connection with FIGS. 5 and 6 could be modified as shown in FIG. 9. As will be seen the pad 5a, which in the position previously indicated would provide a reaction equal to the side force Y, is formed in two equal parts symmetrically disposed with respect to the point X at which the force Y is applied. Similarly the pad 5b is formed in two equal parts of the same size as the parts of the pads 5a. The two pad pairs 6a and 6b are formed by pads of an equal size to the parts of the pads 5a and 5b. Then, depending upon the direction in which the vehicle was required to travel, the pads would be selectively operated, i.e., for travel in the direction indicated by the arrow, only those pads or pad parts which have been shaded would be operated.

Figure 10:
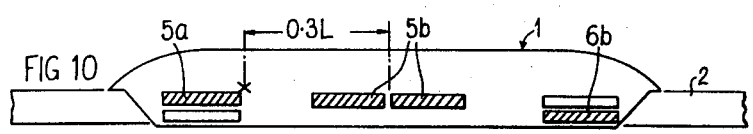
Figure 11:
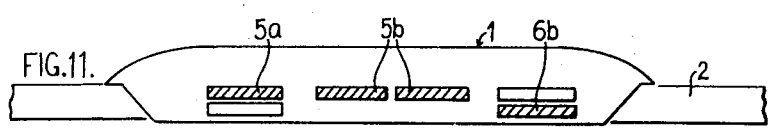

FIGS. 10 and 11 show how the arrangement of FIG. 8 might be modified towards the same end as the modification described in connection with FIG. 9, again only selected pairs of pads or pad parts being operated dependent upon the direction of travel desired, the shading indicating those pads which would be operated for travel from right to left as drawn.

If the pads or pad parts of the arrangements of FIG. 9–11 were of a length 0.15 vehicle length, then the loads thereon would be as follows. In the FIG. 9 arrangement considering a side force Y acting at the point previously specified, a load of 0.5Y would be applied to each of the parts of pad 5a, 0.5Y would be applied to the rear (operative) part of the pad 5b, and −0.5Y on the rear pad 6b. In the arrangement of FIG. 10, 0.3Y would be applied to pad 5a, 0.6Y to each part of pad 5b and 0.5Y to pad 6b. In the arrangement of FIG. 11 the loads on pad 5a and the two parts of pad 5b would be 0.5Y, and on the pad 6b −0.5Y.

It should be noted that to get equal pad loads, the pad or pads at the front of the vehicle should be equally disposed about the equivalent point of action of the side force.

If no movable pads are postulated, the pad arrangements of FIGS. 9 to 11 would involve much the same installed power. However if movable pads could be provided, the arrangement of FIGS. 10 or 11 would probably be preferred as involving less mechanical complexity. On the other hand the provision of anti-roll devices between upper and lower rear pads would probably be easier with the arrangement of FIG. 9 than with those of FIGS. 10 and 11.

In the above only the reaction of steady state externally applied loads has been considered, no consideration being given to the dynamic behavior of a vehicle under loading due to track distortion. A point worth noting in this regard is that with the pad layouts of FIGS. 9 and 11 the vehicle does not yaw under aerodynamic loads, but will under centrifugal loading. The center of gravity of the vehicle is expected to be near the center line of the top of the track and so the point of application of centrifugal loads will almost certainly be above the level of the side guidance pads, as will be the point of application of aerodynamic side forces. Obviously in practice both centrifugal and aerodynamic loadings, which may vary independently, will have to be taken into account to determine the optimum disposition of the pads in relation to the line of action of equivalent side forces.

It will be appreciated that when a vehicle is provided with a number of hoverpads 5 and 6, only selected ones of which are operated dependent upon the desired direction of travel, either each hoverpad may be provided with its own source of air under pressure, e.g., a fan which would only be driven when its associated hoverpad was required to operate, or a single source may be arranged, through suitably controlled ducts, alternatively to supply selected hoverpads.

It should also be understood that the hoverpads may be made up from, and their cushions may be divisible into (e.g., by longitudinal and/or transversely extending air curtains), any desired number of parts, of an equal or an unequal size. When made of several parts, the parts may be articulated.

Although in the above only peripheral air curtain gas cushion means have been specifically described, plenum chamber gas cushion means may be employed. The need for a secondary suspension between the vehicle body, or its side portions, and the means for forming and maintaining a gas cushion, however, remains. In the example given in which air under pressure is supplied to the cushion forming means via bellows, the pressure within these may be adjusted, taking into account their number and area, to transmit at least an appreciable proportion, if not substantially the whole of the load applied to the gas cushion means, between the same and the vehicle body. Furthermore the bellows may be tapered so that the effective area over which the pressure therein acts increases as the bellows progressively collapse upon movement of the gas cushion means towards the vehicle body, or its side portions, as the case may be, increasingly to resist such movement and thereby take over at least part of the function of the springs that have been described to provide a secondary suspension. Otherwise rolling diaphragms defining chambers to serve the same function as the bellows may be employed.

Finally it might be mentioned that it is envisaged that a vehicle in accordance with the invention may be of the order of 120 feet long and 15 feet deep including the side portions. The vehicle may be of the order of 40 tons all-up weight, and a typical size of hoverpad might be 30 feet long by 3 feet wide. Vehicle speeds of up to 300 miles per hour are contemplated.

I claim:

1. A gas cushion vehicle adapted for operation along a prepared track of substantially rectangular cross-section, the vehicle having downwardly extending side portions to embrace the sides of the track, gas cushion support means carried by the vehicle and adapted to form and maintain at least one gas cushion to co-operate with the upper surface of the track to support the vehicle thereon, at least two pairs of gas cushion guide means, one of each pair of said guide means being carried by a respective one of said side portions, each of said guide means being adapted to form and maintain a gas cushion for co-operation with its associated side surface of the track, and being positioned so that the centers of the gas cushions formed and maintained by one of the said pairs of guide means are longitudinally spaced from the centers of the gas cushions formed and maintained by the other of the said pairs of guide means, and lie in substantially the same horizontal plane, and at least one further pair of gas cushion means carried by the said side portions each adapted to form and maintain a gas cushion, one for cooperation with each side of the track, and positioned to that the centers of their cushions lie at a lower level than those of the said guide means and between the longitudinal center of the vehicle and that end thereof which is to the rear in relation to the direction of travel of the vehicle, the said gas cushion guide means and the said further gas cushion means being movable in a direction towards and away from their associated side portions, interconnection means being provided on each side of the vehicle interconnecting the further gas cushion means with the respective gas cushion guide means of at least one pair of the said gas cushion guide means so as to restrict relative movement therebetween in a direction towards and away from their associated side portions.

2. A gas cushion vehicle as claimed in claim 1 in which one of the said pairs of gas cushion guide means is positioned such that the centers of their gas cushions are disposed to the rear of the longitudinal center of the vehicle at the same distance therefrom as the centers of the gas cushions of the other of said pairs of gas cushion guide means are disposed to the fore of said center in relation to the direction of travel of the vehicle.

3. A gas cushion vehicle as claimed in claim 1 in which the said further pair of gas cushion means is positioned so that the centers of their cushions are disposed to the rear of the longitudinal center of the vehicle, and one pair of said gas cushion guide means is positioned above the said further pair of gas cushion means so that the centers of the gas cushions of the said one pair of gas cushion guide means are in alignment in a substantially vertical plane with the centers of the cushions of said further pair of gas cushion means.

4. A gas cushion vehicle as claimed in claim 1 in which the interconnection means comprise at least one torsion bar journalled to the vehicle and connected to respective ones of the said pairs of gas cushion guide means and said further gas cushion means by pivoted links made fast to the torsion bar.

5. A gas cushion vehicle as claimed in claim 1 in which a second pair of further gas cushion means is provided, the said pairs of gas cushion guide means are positioned one to each side of the longitudinal center of the vehicle and equidistantly spaced therefrom, and the said further pairs of gas cushion means are positioned one pair substantially vertically below each of the said pairs of gas cushion guide means, and provision is made, in operation, selectively to operate only that one of the pairs of further gas cushion means which is to the rear in relation to the intended direction of travel, and to render inoperative the other of the said pairs of further gas cushion means.

6. A gas cushion vehicle as claimed in any claim 1 intended for high speed travel in one direction only, in which the rear parts of the side portions of the vehicle are arranged to extend downwardly further than the front parts thereof.

7. A gas cushion vehicle as claimed in claim 1 in which a single-sided linear motor stator structure is carried by the vehicle and is mounted for relative vertical movement with respect thereto and for co-operation with a horizontally mounted reaction rail carried by the top of the track along which the vehicle is adapted to operate.

8. A gas cushion vehicle as claimed in claim 1 in which the said pair of further gas cushion means is positioned such that the centers of their gas cushions are disposed to the rear of the longitudinal center of the vehicle at the same distance therefrom as the centers of the gas cushions of the other of said pairs of gas cushion guide means are disposed to the fore of said center in relation to the direction of travel of the vehicle.

9. A gas cushion vehicle adapted for operation along a prepared track of substantially rectangular cross-section, the vehicle having downwardly extending side portions to embrace the sides of the track, gas cushion support means carried by the vehicle and adapted to form and maintain at least one gas cushion to co-operate with the upper surface of the track to support the vehicle thereon, at least two pairs of gas cushion guide means, one of each pair of said guide means being carried by a respective one of said side portions, each of said guide means being adapted to form and maintain a gas cushion for co-operation with its associated side surface of the track, and being positioned so that the centers of the gas cushions formed and maintained by one of said pairs of guide means are longitudinally spaced from the centers of the gas cushions formed and maintained by the other of the said pairs of guide means, and lie in substantially the same horizontal plane, and at least one further pair of gas cushion means carried by the said side portions each adapted to form and maintain a gas cushion, one for co-operation with each side of the track, and positioned so that the centers of their cushions lie at a lower level than those of the said guide means and between the longitudinal center of the vehicle and that end thereof which is to the rear in relation to the direction of travel of the vehicle, one pair of said gas cushion guide means being positioned above the said further pair of gas cushion means so that the centers of the gas cushions of the said one pair of gas cushion guide means are in alignment in a substantially vertical plane with the centers of the cushions of said further pair of gas cushion means, the said gas cushion guide means and the said further pair of gas cushion means being movable in a direction towards and away from their associated side portions, interconnection means being provided on each side of the vehicle interconnecting the further gas cushion means with the respective gas cushion guide means of the said one pair of gas cushion guide means so as to restrict relative movement therebetween in a direction towards and away from their associated side portions, said interconnection means comprising at least one torsion bar journalled to the vehicle and connected to respective ones of the gas cushion guide means of the said one pair and to said further gas cushion means by pivoted links made fast to the torsion bar.

10. In combination, a gas cushion vehicle and a prepared track along which the vehicle is adapted to operate, the track having substantially vertical side surfaces for guiding the vehicle and a substantially horizontal upper surface extending therebetween for supporting the vehicle, the gas cushion vehicle comprising a vehicle body formed with downwardly extending side portions to embrace the side surfaces of the track, gas cushion support means carried by the vehicle body and adapted to form and maintain at least two longitudinally spaced gas cushions in co-operation with the upper surface of the track to support the vehicle thereon, first and second pairs of gas cushion guide means, one of each said pair of guide means being carried by a respective one of said side portions, each of said guide means being adapted to form and maintain a gas cushion in co-operation with its associated side surface of the track and being positioned so that the centers of the gas cushions formed and maintained by the pairs of guide means lie in substantially the same horizontal plane with the centers of the cushions of the first pair of guide means disposed to the fore of the longitudinal center of the vehicle and the centers of the cushions of the second pair of guide means disposed to the rear of the longitudinal center of the vehicle, a further pair of gas cushion means carried by the side portions each adapted to form and maintain a gas cushion, one for co-operation with each side surface of the track, and positioned so that the centers of their cushions lie below, and in substantially vertical alignment with, those of the said second pair of guide means, the gas cushion support means, the gas cushion guide means and the further gas cushion means being each movable in a direction towards and away from their attachment to the vehicle body, interconnection means interconnecting the respective further gas cushion means and the gas cushion guide means of the said second pair so as to restrict relative movement therebetween in a direction towards and away from their associated side portions, and a single-sided linear induction motor stator structure carried by the vehicle body and mounted for relative vertical movement with respect thereto, the track comprising a generally horizontal linear induction motor reaction rail extending along, and forming part of, the upper surface of the track for co-operation with the stator structure whereby to propel the vehicle.

* * * * *